United States Patent
Koladi et al.

(10) Patent No.: US 10,824,524 B2
(45) Date of Patent: Nov. 3, 2020

(54) SYSTEMS AND METHODS FOR PROVIDING CONTINUOUS MEMORY REDUNDANCY, AVAILABILITY, AND SERVICEABILITY USING DYNAMIC ADDRESS SPACE MIRRORING

(71) Applicant: Dell Products L.P., Round Rock, TX (US)

(72) Inventors: Krishnaprasad Koladi, Bangalore (IN); Wei G. Liu, Austin, TX (US); Gobind Vijayakumar, Trichy (IN); Murugan Sekar, Tindivanam (IN)

(73) Assignee: Dell Products L.P., Round Rock, TX (US)

(*) Notice: Subject to any disclaimer, the term of this patent is extended or adjusted under 35 U.S.C. 154(b) by 11 days.

(21) Appl. No.: 16/178,823

(22) Filed: Nov. 2, 2018

(65) Prior Publication Data
US 2020/0142824 A1     May 7, 2020

(51) Int. Cl.
| | |
|---|---|
| *G06F 11/16* | (2006.01) |
| *G06F 12/02* | (2006.01) |
| *G06F 11/20* | (2006.01) |
| *G06F 11/14* | (2006.01) |
| *G06F 11/10* | (2006.01) |

(52) U.S. Cl.
CPC ...... *G06F 11/1666* (2013.01); *G06F 11/1048* (2013.01); *G06F 11/1484* (2013.01); *G06F 11/2017* (2013.01); *G06F 11/2058* (2013.01); *G06F 12/0284* (2013.01); *G06F 2201/815* (2013.01); *G06F 2212/656* (2013.01); *G06F 2212/657* (2013.01)

(58) Field of Classification Search
CPC .... G06F 3/061; G06F 3/0611; G06F 11/1666; G06F 11/2017; G06F 11/1048; G06F 11/1484; G06F 11/2058; G06F 2201/815
See application file for complete search history.

(56) References Cited

U.S. PATENT DOCUMENTS

| | | | | |
|---|---|---|---|---|
| 6,075,938 | A  * | 6/2000 | Bugnion | G06F 9/544 703/27 |
| 2003/0225800 | A1* | 12/2003 | Kavuri | G06F 11/1448 |
| 2009/0282300 | A1* | 11/2009 | Heyrman | G06F 11/2082 714/708 |

* cited by examiner

*Primary Examiner* — Reginald G Bragdon
*Assistant Examiner* — Thanh D Vo
(74) *Attorney, Agent, or Firm* — Jackson Walker L.L.P.

(57) ABSTRACT

An information handling system may include one or more processors, a memory system communicatively coupled to the one or more processors, and a program of instructions embodied in non-transitory computer readable media and configured to, when read and executed by the one or more processors, create operating system level-mirroring of address spaces for data associated with one or more processes executing on the one or more processors and dynamically reallocate address spaces used for mirroring of the data for a process of the one or more processes from a first address space to a second address space responsive to a determination that a number of correctable bit errors of a memory page associated with the first address space exceeds a threshold.

12 Claims, 2 Drawing Sheets

SYSTEMS AND METHODS FOR PROVIDING CONTINUOUS MEMORY REDUNDANCY, AVAILABILITY, AND SERVICEABILITY USING DYNAMIC ADDRESS SPACE MIRRORING

TECHNICAL FIELD

The present disclosure relates in general to information handling systems, and more particularly to systems and methods for providing continuous memory redundancy, availability, and serviceability using dynamic address space mirroring.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many approaches presently exist for protecting memory from uncorrectable errors. However, most existing approaches do not provide continuous protection, in the sense that such approaches may provide protection from memory faults only a finite number of times. Also, certain processor and chipset implementations do not provide support for memory mirroring at a hardware level.

SUMMARY

In accordance with the teachings of the present disclosure, the disadvantages and problems associated with existing approaches to providing redundancy, availability, and serviceability (RAS) in memory of an information handling system may be reduced or eliminated.

In accordance with embodiments of the present disclosure, an information handling system may include one or more processors, a memory system communicatively coupled to the one or more processors, and a program of instructions embodied in non-transitory computer readable media and configured to, when read and executed by the one or more processors, create operating system level-mirroring of address spaces for data associated with one or more processes executing on the one or more processors and dynamically reallocate address spaces used for mirroring of the data for a process of the one or more processes from a first address space to a second address space responsive to a determination that a number of correctable bit errors of a memory page associated with the first address space exceeds a threshold.

In accordance with these and other embodiments of the present disclosure, a method may include, in an information handling system comprising one or more processors and a memory system communicatively coupled to the one or more processors, creating operating system level-mirroring of address spaces for data associated with one or more processes executing on the one or more processors and dynamically reallocating address spaces used for mirroring of the data for a process of the one or more processes from a first address space to a second address space responsive to a determination that a number of correctable bit errors of a memory page associated with the first address space exceeds a threshold.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising one or more processors and a memory system communicatively coupled to the one or more processors, create operating system level-mirroring of address spaces for data associated with one or more processes executing on the one or more processors and dynamically reallocate address spaces used for mirroring of the data for a process of the one or more processes from a first address space to a second address space responsive to a determination that a number of correctable bit errors of a memory page associated with the first address space exceeds a threshold.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
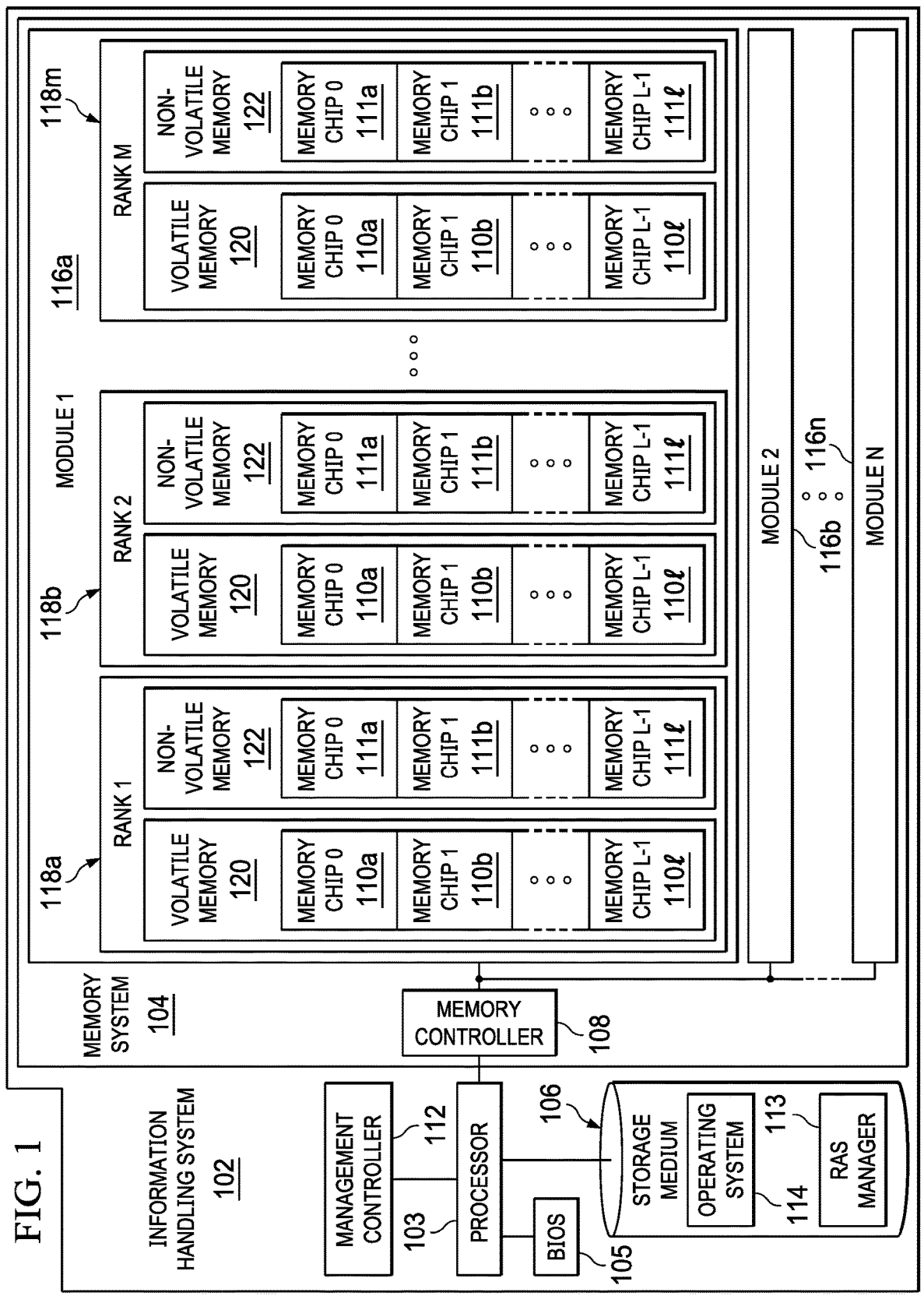
FIG. 1 illustrates a block diagram of an example information handling system in accordance with embodiments of the present disclosure.
Figure 2:
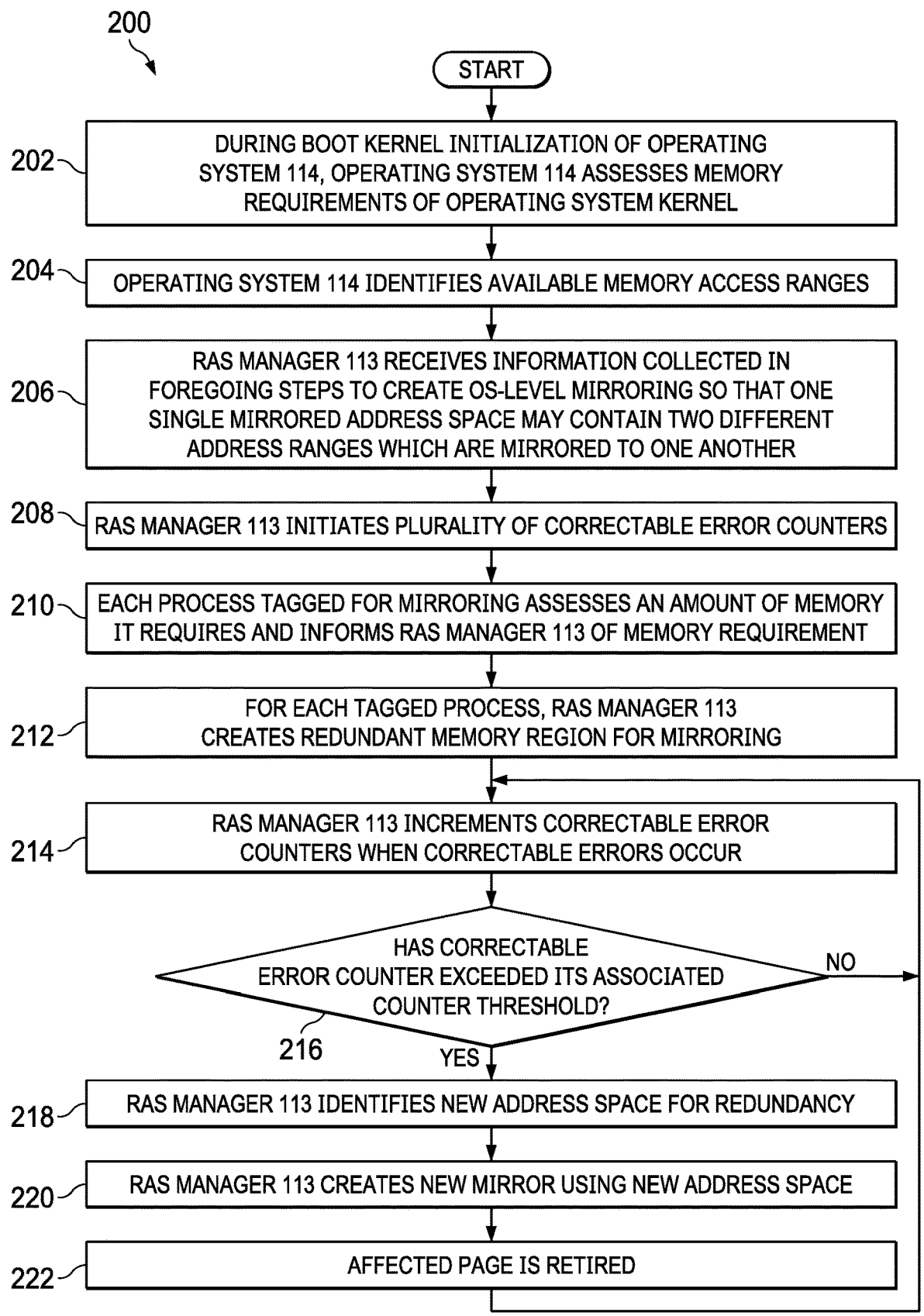
FIG. 2 illustrates a flow chart of an example method for providing continuous memory RAS in a memory using dynamic address space mirroring, in accordance with embodiments of the present disclosure.

Preferred embodiments and their advantages are best understood by reference to FIGS. 1 and 2, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102 in accordance with certain embodiments of the present disclosure. In certain embodiments, information handling system 102 may comprise a computer chassis or enclosure (e.g., a server chassis holding one or more server blades). In other embodiments, information handling system 102 may be a personal computer (e.g., a desktop computer or a portable computer). As depicted in FIG. 1, information handling system 102 may include a processor 103, a memory system 104 communicatively coupled to processor 103, a basic input/output system (BIOS) 105 communicatively coupled to processor 103, a storage medium 106 communicatively coupled to processor 103, and a management controller 112 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory system 104, BIOS 105, storage medium 106, and/or another component of information handling system 102.

Memory system 104 may be communicatively coupled to processor 103 and may comprise any system, device, or apparatus operable to retain program instructions or data for a period of time (e.g., computer-readable media). Memory system 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory system 104 may comprise a persistent memory (e.g., comprising one or more NVDIMMs) that includes volatile memory (e.g., DRAM or other volatile random-access memory) and non-volatile memory (e.g., flash memory or other non-volatile memory), as described in greater detail below.

As shown in FIG. 1, memory system 104 may include memory controller 108 and one or more memory modules 116a-116n communicatively coupled to memory controller 108. Memory controller 108 may be any system, device, or apparatus configured to manage and/or control memory system 104. For example, memory controller 108 may be configured to read data from and/or write data to memory modules 116 comprising memory system 104. Additionally or alternatively, memory controller 108 may be configured to refresh memory modules 116 and/or memory chips 110 thereof in embodiments in which memory system 104 (or a portion thereof) comprises DRAM. Although memory controller 108 is shown in FIG. 1 as an integral component of memory system 104, memory controller 108 may be separate from memory system 104 and/or may be an integral portion of another component of information handling system 102 (e.g., memory controller 108 may be integrated into processor 103).

Each memory module 116 may include any system, device or apparatus configured to retain program instructions and/or data for a period of time (e.g., computer-readable media). As shown in FIG. 1, a memory module 116 may comprise a persistent memory (e.g., NVDIMM) comprising volatile memory 120 and non-volatile memory 122. In particular embodiments, a memory module 116 may comprise an NVDIMM-N implementation, in which volatile memory 120 and non-volatile memory 122 exist on the same memory module 116, and a memory module 116 may present only volatile memory 120 to OS 114, and any save operations that are performed invisibly to OS 114 in the event of a power loss. As depicted in FIG. 1, each memory module 116 may include one or more ranks 118a-118m. Each memory rank 118 within a memory module 116 may be a block or area of data created using some or all of the memory capacity of the memory module 116. In some embodiments, each rank 118 may be a rank as such term is defined by the JEDEC Standard for memory devices.

As shown in FIG. 1, each rank 118 may include a non-volatile memory 120 and an associated non-volatile memory 122. Each rank-level volatile memory 120 may include a plurality of memory chips 110, and each rank-level non-volatile memory 122 may include a plurality of memory chips 111. Each memory chip 110 may include a packaged integrated circuit configured to comprise a plurality of volatile memory cells for storing data. In some embodiments, a memory chip 110 may include dynamic random access memory (DRAM). Each memory chip 111 may include a packaged integrated circuit configured to comprise a plurality of non-volatile memory cells for storing data. In some embodiments, a memory chip 111 may include flash memory.

During normal operation, when an electrical power source provides adequate power to components of information handling system 102, data written to memory 104 from processor 103 may be stored in volatile memory 120. However, in the event of loss of system input power or a power fault that prevents delivery of electrical energy from the power source to memory 104, data stored in volatile memory 120 may be transferred to non-volatile memory 122 in a save operation. After input power is restored, or a faulty power source is replaced, such that the power source is again operable to provide electrical energy to information handling resources of information handling system 102, on the subsequent power-on of information handling system 102, data may be copied from non-volatile memory 122 back to volatile memory 120 via a restore operation. The combined actions of data save and then data restore, allow the data to remain persistent through a power disruption. Accordingly, although not explicitly shown in FIG. 1, memory 104 may also include hardware, firmware, and/or software for carrying out save operations.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Storage medium 106 may be communicatively coupled to processor 103. Storage medium 106 may include any system, device, or apparatus operable to store information processed by processor 103. Storage medium 106 may include, for example, network attached storage, one or more direct access storage devices (e.g., hard disk drives), and/or one or more sequential access storage devices (e.g., tape drives). As shown in FIG. 1, storage medium 106 may have stored thereon an operating system (OS) 114 and a RAS manager 113. OS 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory system 104 for execution by processor 103.

RAS manager 113 may be any program of executable instructions, or aggregation of programs of executable instructions, configured to manage and/or control the allocation and usage of dynamic memory mirroring within memory system 104 in order to optimize RAS of memory system 104, as described in greater detail below. In some embodiments, RAS manager 113 may be an integral portion of OS 114. In other embodiments, RAS manager 113 may comprise a driver or other service of OS 114. In yet other embodiments, RAS manager 113 may comprise a standalone application program configured to execute on OS 114. In yet other embodiments, RAS manager 113 may reside in BIOS 105 and may execute as a part of BIOS. Regardless of where RAS manager 113 is stored, active portions of RAS manager 113 may be transferred to memory 104 for execution by processor 103.

Management controller 112 may be configured to provide management facilities for management of information handling system 102. Such management may be performed by management controller 112 even if information handling system 102 is powered off or powered to a standby state. Management controller 112 may include a processor and a management network interface separate from and physically isolated from a data network interface of information handling system 102. In certain embodiments, management controller 112 may include or may be an integral part of a baseboard management controller (BMC) or a remote access controller (e.g., a Dell Remote Access Controller or Integrated Dell Remote Access Controller).

In addition to processor 103, memory system 104, BIOS 105, storage medium 106, and management controller 112, information handling system 102 may include one or more other information handling resources.

In addition, for the purposes of clarity and exposition, information handling system 102 is shown having a single processor coupled to memory system 104. However, in some embodiments, information handling system 102 may have a plurality of processors 103, each processor 103 residing within a respective Non-Uniform Memory Access (NUMA) domain comprising a respective portion of memory modules 116 of memory system 104.

Further, for the purposes of clarity and exposition, information handling memory system 104 is shown as comprising NVDIMM-N modules 116. However, it is understood that memory system 104 may comprise memory implementations other than NVDIMM-N, including without limitation non-persistent memory implementations (e.g., in which case memory modules 116 would not include non-volatile memories 122) and/or a registered dual-inline memory module (RDIMM) implementation (e.g., in which case a buffer, not shown, may be interfaced between memory controller 108 and memory modules 116 for buffering memory control signals).

In operation, RAS manager 113 may be configured to provide a dynamic mirroring of address space ranges and the loading and moving of critical data to maintain RAS. RAS manager 113 may also provide for dynamic creation of memory namespaces and mirroring of such namespaces to achieve mirroring (e.g., within NVDIMM namespaces). Functionality of RAS manager 113 is further discussed below with respect to method 200 of FIG. 2.

FIG. 2 illustrates a flow chart of an example method for providing continuous memory RAS in a memory using dynamic address space mirroring, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, during boot kernel initialization of OS 114, OS 114 may assess the memory requirements of the kernel, such as, for example, memory address space requirements for the kernel, boot critical drivers, and/or other critical components.

At step 204, OS 114 may identify available memory access ranges. In the case of RDIMMs, OS 114 may use a UEFI memory map, E820 map, or similar memory map to identify the address ranges available for RDIMMs. In the case of an NVDIMM configuration, OS 114 may, using NVDIMM Firmware Interface Table (NFIT), identify available address space in the NVDIMMs, and trigger a dynamic namespace creation for such specific address space. OS 114 may also identify another available address space of the same size within NVDIMMs for mirroring.

At step 206, RAS manager 113 may receive the information collected in the foregoing steps, and may use OS Advanced Configuration and Power Interface (ACPI) methods to create OS-level mirroring (or in some cases, BIOS-level mirroring) so that one single mirrored address space may contain two different address ranges which are mirrored to one another. Critical components such as the OS kernel and critical boot drivers may be loaded into redundant memory (e.g., into the RDIMM provided redundant memory region or NVDIMM redundant namespace). In this case, the existing address space in which the OS kernel and critical components is originally loaded may be referred to as a "primary address space" and the redundant area as a "secondary address space." The secondary address space may be physically and/or logically located proximate to the primary address space (e.g., within the same NUMA domain) in order to reduce performance penalties associated with maintaining mirroring.

At step 208, RAS manager 113 may initiate a plurality of correctable error counters, each correctable error counter associated with a memory page initialized within memory system 104. In connection with the correctable error counters, RAS manager 113 (or OS 114) may define a correctable error threshold that defines a limit of correctable errors that may occur in a memory page before RAS manager 113 dynamically reallocates and copies data to another memory page, as a large number of correctable errors may indicate a greater likelihood of an uncorrectable error occurring in the memory page.

At step 210, for each process that is tagged for mirroring, each such process may assess an amount of memory it requires and inform RAS manager 113 of such memory requirement (e.g., using user-kernel application program interfaces (APIs), such as the copy_from_user( ) API). As for tagging of applications, upon boot of OS 114, systems management software, such as that executing on management controller 112, OpenManage, or other suitable systems management software, may provide options to a system administrator and/or end user to tag operating system processes. Thus, tagging a process may cause the process to consume redundant memory address spaces, as described herein.

At step 212, for each tagged process, RAS manager 113 may create a redundant region (e.g., based on the process memory size requirement for the tagged process) and allocate the address space for the specific process. In some embodiments, the address spaces selected for mirroring may be based on the NUMA node in which the application is tagged, so as to maximize performance associated with mirroring. Furthermore, the redundant region of the memory may be created by identifying a secondary address space which is physically and/or logically close to the primary address space for the process (e.g., within the same NUMA domain). Once mirroring for the process has been created, the process may execute in its normal fashion, and RAS manager 113 will operate in the background mirroring data for the process from the current memory address space for the process to the newly-identified mirror address space.

At step 214, RAS manager 113 may interface with existing OS APIs to appropriately increment the correctable error counters when correctable errors occur and compare such counters to applicable thresholds. At step 216, RAS manager 113 may determine if a correctable error counter has exceeded its associated counter threshold. If a correctable error counter has exceeded its associated counter threshold, method 200 may proceed to step 218. Otherwise, method 200 may return to step 214.

At step 218, responsive to a correctable error counter exceeding its associated counter threshold, RAS manager 113 may identify a new address space based on the affected redundant memory region address space size. Such identification may be performed in RDIMM implementations by identifying a new available RDIMM address space and may be performed in NVDIMM implementations by creating a new namespace out of another available NVDIMM address space. In some embodiments, such identification may also include selecting an address space which has a low number of correctable errors as indicated by the correctable error counter for such address space. In other words, identifying the new address space may include identifying a plurality of candidate address spaces for the new address space and selecting the new address space from the plurality of candidate address spaces based on a respective number of correctable bit errors that have occurred within each of the plurality of candidate address spaces.

At step 220, once the new address space is identified, RAS manager 113 may create a new mirror using the new address space. At step 222, the affected page (e.g., the page having its correctable error counter exceed its associated counter threshold) may be retired so that it is not reused. After completion of step 222, method 200 may proceed again to step 214.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented in whole or part using RAS manager 113, and/or any other system operable to implement method 200. In certain embodiments, method 200 may be implemented partially or fully in software and/or firmware embodied in computer-readable media.

Advantageously, the systems and methods disclosed herein may provide for continuous memory RAS for address spaces holding critical processes. With respect to NVDIMM implementations, such continuous memory RAS is enabled by dynamic namespace creation and mirroring.

In the systems and methods disclosed above, RAS may be made more robust by selecting the secondary address space for mirroring within the same memory domain (e.g., NUMA domain) as the processor node in which the critical process requiring mirroring is executing. However, in other embodiments, address spaces may be spanned across memory domains if the performance degradation associated with having memory mirrored across memory domains is acceptable.

A rules-based method may also be used to select address spaces for mirroring, including selecting address spaces which have experienced a low number of correctable errors.

The systems and methods described herein also enable user tagging of critical processes and remapping of such processes to a redundant memory region without process downtime.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   one or more processors;
   a memory system communicatively coupled to the one or more processors; and
   a program of instructions embodied in non-transitory computer readable media and configured to, when read and executed by the one or more processors:
   receive a user selection of one or more processes tagged for mirroring;
   in response to the user selection, create operating system-level mirroring of address spaces for data associated with the one or more processes executing on the one or more processors; and
   dynamically reallocate address spaces used for mirroring of the data for a process of the one or more processes from a first address space to a second address space responsive to a determination that a number of correctable bit errors of a memory page associated with the first address space exceeds a threshold.

2. The information handling system of claim 1, wherein creating operating system-level mirroring of address spaces for data associated with one or more processes executing on the one or more processors comprises, for each process of the one or more processes, selecting an address space within a non-uniform memory access (NUMA) memory domain of a processor of the one or more processors executing such process.

3. The information handling system of claim 1, wherein dynamically reallocating an address space used for mirroring of data for the process of the one or more processes comprises selecting the second address space based on proximity of the second address space to a processor of the one or more processors executing the process.

4. The information handling system of claim 1, wherein dynamically reallocating an address space used for mirroring of data for the process of the one or more processes comprises:
   identifying a plurality of candidate address spaces for the second address space; and
   selecting the second address space from the plurality of candidate address spaces based on a respective number of correctable bit errors that have occurred within each of the plurality of candidate address spaces.

5. A method comprising, in an information handling system comprising one or more processors and a memory system communicatively coupled to the one or more processors:
   receiving a user selection of one or more processes tagged for mirroring;
   in response to the user selection, creating operating system-level mirroring of address spaces for data associated with one or more processes executing on the one or more processors; and
   dynamically reallocating address spaces used for mirroring of the data for a process of the one or more processes from a first address space to a second address space responsive to a determination that a number of correctable bit errors of a memory page associated with the first address space exceeds a threshold.

6. The method of claim 5, wherein creating operating system-level mirroring of address spaces for data associated with one or more processes executing on the one or more processors comprises, for each process of the one or more processes, selecting an address space within a non-uniform memory access (NUMA) memory domain of a processor of the one or more processors executing such process.

7. The method of claim 5, wherein dynamically reallocating an address space used for mirroring of data for the process of the one or more processes comprises selecting the second address space based on proximity of the second address space to a processor of the one or more processors executing the process.

8. The method of claim 5, wherein dynamically reallocating an address space used for mirroring of data for the process of the one or more processes comprises:
   identifying a plurality of candidate address spaces for the second address space; and
   selecting the second address space from the plurality of candidate address spaces based on a respective number of correctable bit errors that have occurred within each of the plurality of candidate address spaces.

9. An article of manufacture comprising:
   a non-transitory computer-readable medium; and
   computer-executable instructions carried on the computer-readable medium, the instructions readable by a processor, the instructions, when read and executed, for causing the processor to, in an information handling system comprising one or more processors and a memory system communicatively coupled to the one or more processors:
      receive a user selection of one or more processes tagged for mirroring;
      in response to the user selection, create operating system-level mirroring of address spaces for data associated with one or more processes executing on the one or more processors; and
      dynamically reallocate address spaces used for mirroring of the data for a process of the one or more processes from a first address space to a second address space responsive to a determination that a number of correctable bit errors of a memory page associated with the first address space exceeds a threshold.

10. The article of claim 9, wherein creating operating system-level mirroring of address spaces for data associated with one or more processes executing on the one or more processors comprises, for each process of the one or more processes, selecting an address space within a non-uniform memory access (NUMA) memory domain of a processor of the one or more processors executing such process.

11. The article of claim 9, wherein dynamically reallocating an address space used for mirroring of data for the process of the one or more processes comprises selecting the second address space based on proximity of the second address space to a processor of the one or more processors executing the process.

12. The article of claim 9, wherein dynamically reallocating an address space used for mirroring of data for the process of the one or more processes comprises:
   identifying a plurality of candidate address spaces for the second address space; and
   selecting the second address space from the plurality of candidate address spaces based on a respective number of correctable bit errors that have occurred within each of the plurality of candidate address spaces.

* * * * *